United States Patent Office 3,433,796
Patented Mar. 18, 1969

3,433,796
ETHERS OF α-(2-PYRIDYL) BENZYL ALCOHOLS
Wijbe T. Nauta, Niew Loosdrecht, Netherlands, assignor to N.V. Koninklijke Pharmaceutische Fabrieken v/h Brocades-Stheeman & Pharmacia, Amsterdam, Netherlands
No Drawing. Filed Aug. 23, 1965, Ser. No. 481,920
Claims priority, application Great Britain, Sept. 23, 1964, 38,842/64
The portion of the term of the patent subsequent to Nov. 21, 1984, has been disclaimed
U.S. Cl. 260—296　　　　　　　　　　6 Claims
Int. Cl. C07d 31/42, 31/28; A61k 27/00

ABSTRACT OF THE DISCLOSURE

This invention relates to new therapeutically useful ethers of α-(2-pyridyl) benzyl alcohols in accordance with the following formula

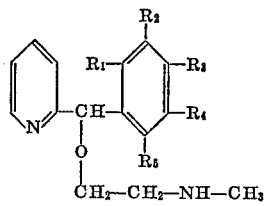

$$\text{CH}_2\text{—CH}_2\text{—NH—CH}_3$$

wherein $R_1$, $R_2$, $R_3$, $R_4$ and $R_5$ each represent either a lower alkyl group or hydrogen. These compounds and their acid addition salts are therapeutically active compounds possessing diuretic activity.

---

This invention relates to new therapeutically useful ethers of α-(2-pyridyl) benzyl alcohols and their acid addition salts, to processes for their preparation and to pharmaceutical compositions containing them.

According to the present invention, there are provided the new ethers of α-(2-pyridyl) benzyl alcohols of the general formula:

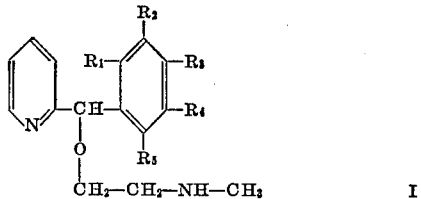

$$\text{CH}_2\text{—CH}_2\text{—NH—CH}_3 \qquad \text{I}$$

wherein $R_1$, $R_2$, $R_3$, $R_4$ and $R_5$ are the same or different and each represents a lower alkyl group or a hydrogen atom. By the term "lower alkyl" as used in this specification and accompanying claims is meant straight or branched alkyl groups having at most 4 carbon atoms.

The aforesaid new ethers are therapeutically active compounds having diuretic activity. When used for therapeutic purposes they may be employed as such or in the form of non-toxic acid addition salts, i.e. salts which are not harmful to the animal organism when used in therapeutic doses. Such salts may be derived from inorganic acids such as the hydrohalic acids (especially hydrochloric and hydrobromic acid) and organic acids such as maleic, fumaric, citric, lactic, acetic, oxalic, tartaric and pamoic acids. The preferred compounds of formula I are those wherein $R_1$ and $R_5$ each represent a lower alkyl group and $R_2$, $R_3$ and $R_4$ each represent a hydrogen atom and, in particular, the β-methylaminoethyl ether of α-(2-pyridyl)-2,6-diethylbenzyl alcohol and its non-toxic acid addition salts.

According to a feature of the present invention, the ethers of α-(2-pyridyl) benzyl alcohols of Formula I are prepared by the process which comprises removing by methods known per se a methyl group from the nitrogen atom of the dimethylamino group of a compound of the formula:

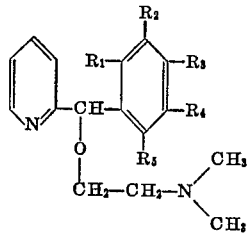

$$\text{CH}_2\text{—CH}_2\text{—N}\begin{matrix}\text{CH}_3\\\text{CH}_3\end{matrix} \qquad \text{II}$$

(wherein the various symbols are as hereinbefore defined). A suitable method for effecting the dimethylation consists in the oxidation of a methyl group to a carboxyl group by means of a suitable oxidizing agent and effecting decarboxylation of the N-carboxy compound so obtained. The oxidation develops especially smoothly if a permanganate such as potassium permanganate is employed as the oxidizing agent. The reaction is preferably carried out in an inert organic solvent such as pyridine or quinoline. Heating of the solution during the oxidation reaction is not necessary but may be suitable to increase the rate of the concomitant decarboxylation reaction.

The starting materials of Formula II can be obtained by using the methods for their preparation described in the specification of my copending U.S. application Serial No. 319,951, filed October 30, 1963, which application is a continuation-in-part application of U.S. application Serial No. 150,658 (now abandoned).

Acid addition salts of the compounds of Formula I are prepared in a manner known per se, e.g. by dissolving the base in an inert organic solvent such as diethyl ether, an alcohol or benzene, and adding an equivalent quantity of the acid suitably dissolved in the same solvent.

The following example illustrates the invention.

EXAMPLE I

To a solution of 31.2 g. of the β-dimethylamino ethyl ether of α-(2-pyridyl)-2,6-diethylbenzyl alcohol in 2 l. of pyridine is added drop-wise a solution of 35 g. of potassium permanganate in 2 l. of 0.5% potassium hydroxide. The temperature is kept at 25° C. during the addition. The reaction mixture is left standing overnight and manganese dioxide is then filtered off. The filtrate is concentrated to one quarter of its original volume and extracted with diethyl ether. The solution in ether is washed with water until a neutral reaction is obtained, and thereafter dried with magnesium sulphate. After filtration the solution is concentrated by evaporation of the solvent under reduced pressure. Toluene is added and distilled off. This procedure is repeated until the odor of pyridine is no longer perceptible. The remaining oil is dissolved in isopropanol and a solution of oxalic acid in isopropanol is added. The oxalate of the β-methylaminoethyl ether of α-(2-pyridyl)-2,6-diethylbenzyl alcohol is obtained in crystalline form. Yield 37%. Melting point 162–163.5° C.

The hydrochloride can be obtained by dissolving the crude free base in diethyl ether and adding a solution of hydrogen chloride in the same solvent. The hydrochloride melts at 145–146° C. after purification.

*Analysis.*—Calculated for $C_{19}H_{27}N_2OCl$: C, 68.14%; H, 8.12%; N, 8.36%; Cl, 10.58%. Found: C, 67.94%; H, 8.24%; N, 8.33%; Cl, 10.68%.

The invention includes within its scope pharmaceutical compositions containing, as active ingredient, at least one of the therapeutically active compounds of general Formula I, or non-toxic acid addition salt thereof, in association with a pharmaceutically acceptable carrier. The preparations may take any of the forms customarily employed for administration of therapeutically active substances but the preferred types are those suitable for oral administration, and especially tablets, pills and capsules including the substance. The tablets and pills may be formulated in the usual manner with one or more pharmacologically acceptable diluents or excipients, for example lactose or starch, and include materials of a lubracting nature, for example calcium stearate. Capsules made of absorbable material, for example gelatin, may contain the active substance alone or in admixture with a solid or liquid diluent. Liquid preparations may be in the form of supensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e. as a suspension or emulsion in sterile water, or an organic liquid usually employed for injectable preparations, for example a vegetable oil such as olive oil, or a sterile solution in an organic solvent.

The following example illustrates pharmaceutical compositions according to the invention.

EXAMPLE II

Tablets are prepared in the usual way containing the following ingredients:

|  | Mg. |
|---|---|
| β-methylaminoethyl α-(2-pyridyl)-2,6-diethylbenzyl ether | 50 |
| Magnesium stearate | 3 |
| Talc | 22 |
| Basic granulate | 189 |

The basic granulate is prepared from:

| Milk sugar | g | 800 |
|---|---|---|
| Oxidized potato starch | g | 200 |
| 5% solution of oxidized potato starch in distilled water | ml | 200 |

The above components of the basic granulate are mixed, granulated, dried and sieved through a 25-mesh sieve.

What I claim and desire to secure by Letters Patent is:

1. An ether of an α-(2-pyridyl) benzyl alcohol of the general formula

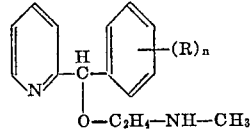

wherein R is lower alkyl, n is 1 to 5 and the total number of R carbon atoms is at least 4.

2. A pharmaceutically acceptable acid addition salt of an ether in accordance with claim 1.

3. A compound in accordance with claim 1 having the name β-methylaminoethyl-α-(2-pyridyl)-2,6-diethylbenzyl ether.

4. A pharmaceutically acceptable acid addition salt of the ether of claim 3.

5. A process for the preparation of an ether of claim 1 which comprises oxidizing a compound of the formula

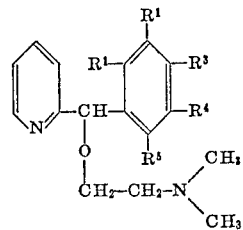

wherein $R^1$, $R^2$, $R^3$, $R^4$ and $R^5$ are each selected from the group consisting of hydrogen and lower alkyl, at the nitrogen atom of the dimethylamino group to ultimately convert one of the methyl groups attached to said nitrogen atom to a hydrogen atom.

6. The process as defined in claim 5, wherein said oxidizing comprises contacting said compound with an alkaline permanganate solution.

References Cited

UNITED STATES PATENTS 2,606,194 8/1952 Shelton et al. _____ 260—296
2,606,195 8/1952 Tilford et al. _____ 260—296

FOREIGN PATENTS 230,374 12/1963 Austria.

OTHER REFERENCES

Houben-Wehl Methoden der Org. Chem., Verlag, Band XI/1, pp. 985–6 (1952).

HENRY R. JILES, *Primary Examiner.*

A. L. ROTMAN, *Assistant Examiner.*

U.S. Cl. X.R.

260—295; 424—263